Dec. 20, 1955    J. M. CUNNINGHAM    2,727,952
SENSING MECHANISM

Original Filed May 1, 1952    3 Sheets-Sheet 1

INVENTOR
JAMES M. CUNNINGHAM
BY
*G. L. Gugger*
AGENT

Dec. 20, 1955    J. M. CUNNINGHAM    2,727,952
SENSING MECHANISM

Original Filed May 1, 1952    3 Sheets-Sheet 2

INVENTOR.
JAMES M. CUNNINGHAM
BY
*G. R. Gugger*
AGENT

Dec. 20, 1955   J. M. CUNNINGHAM   2,727,952
SENSING MECHANISM
Original Filed May 1, 1952   3 Sheets-Sheet 3
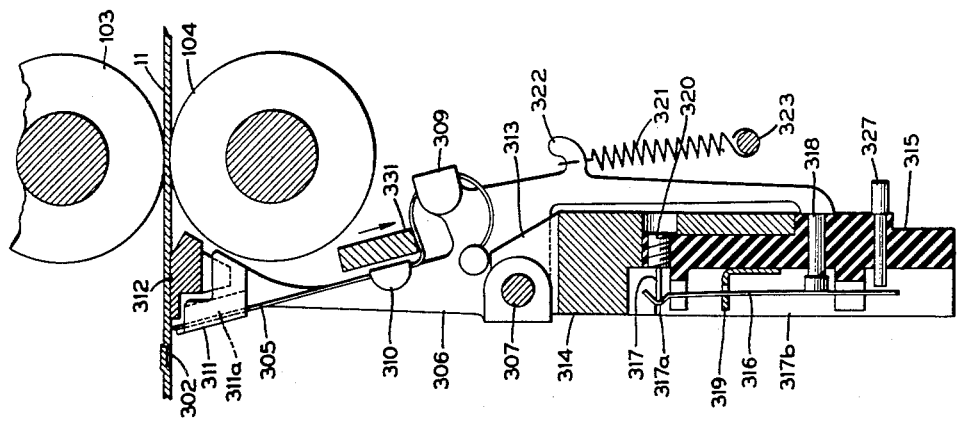
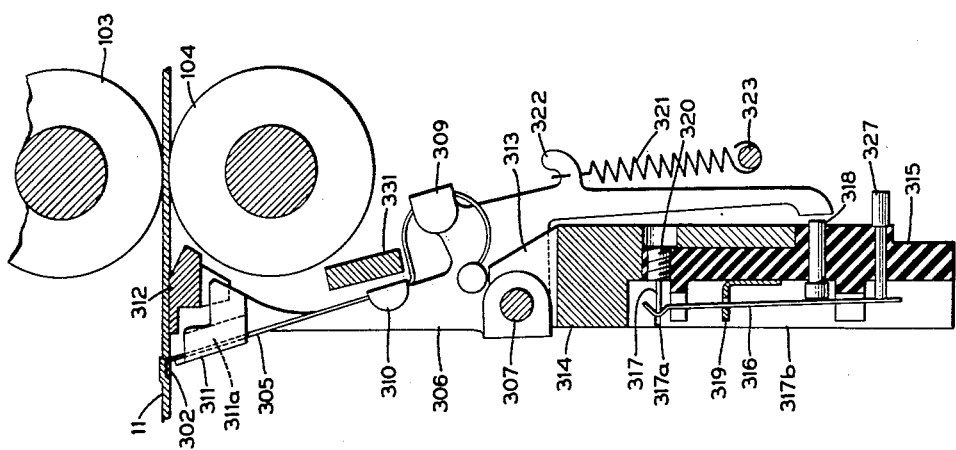
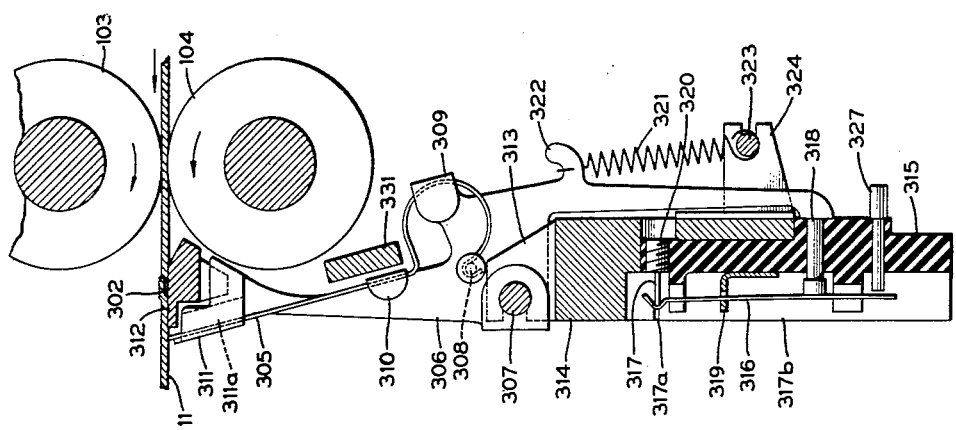
INVENTOR
JAMES M. CUNNINGHAM
BY
AGENT United States Patent Office 2,727,952
Patented Dec. 20, 1955

2,727,952

SENSING MECHANISM

James M. Cunningham, Endicott, N. Y., assignor to International Business Machines Corporation, New York, N. Y., a corporation of New York Original application May 1, 1952, Serial No. 285,566. Divided and this application May 28, 1953, Serial No. 357,993

9 Claims. (Cl. 200—46)

This invention relates to a machine for perforating record cards, and more particularly to a perforating machine for converting small pierced holes on record cards into larger holes.

This application is a division of the application in the name of J. M. Cunningham, Serial No. 285,566, filed May 1, 1952. In the present application, the disclosure and claims are restricted solely to improvements in the sensing mechanism.

The principal object of the invention is to provide a novel wire sensing unit adapted for sensing small pierced holes in record cards. In the illustrative embodiment, the invention is shown applied to a machine wherein record cards containing data in the form of small pierced holes are run through the punch unit of the machine and the data is converted into larger holes on these same record cards. For this reason it is desirable to provide the punching machine with a sensing mechanism which will rapidly and accurately sense the small pierced holes in the record cards.

Another object of the invention is to provide a wire sensing unit adapted for sensing small pierced holes in record cards wherein suitable contact means are closed when a sensing wire encounters a perforation, the duration of closure of said contact means being dependent upon the movement being imparted to the sensing wire by a perforation in the card being sensed and the time of operation of a sensing wire restoring bail. It is desirable when sensing small pierced perforations to provide means for controlling the duration of closure of the sensing contacts so that said duration of closure is not dependent upon the physical dimensions of the perforations themselves.

Other objects of the invention will be pointed out in the following description and claims and illustrated in the accompanying drawings, which disclose, by way of example, the principle of the invention and the best mode, which has been contemplated, of applying that principle.

In the drawings:

Fig. 4a is a sectional view showing the position of the components of the wire sensing unit when no perforations are being sensed.

Fig. 4b is a sectional view showing the position of the components of the wire sensing unit when sensing a perforation.

Fig. 4c is a sectional view showing the position of the components of the wire sensing unit after operation of the restoring bail.

Figure 1:
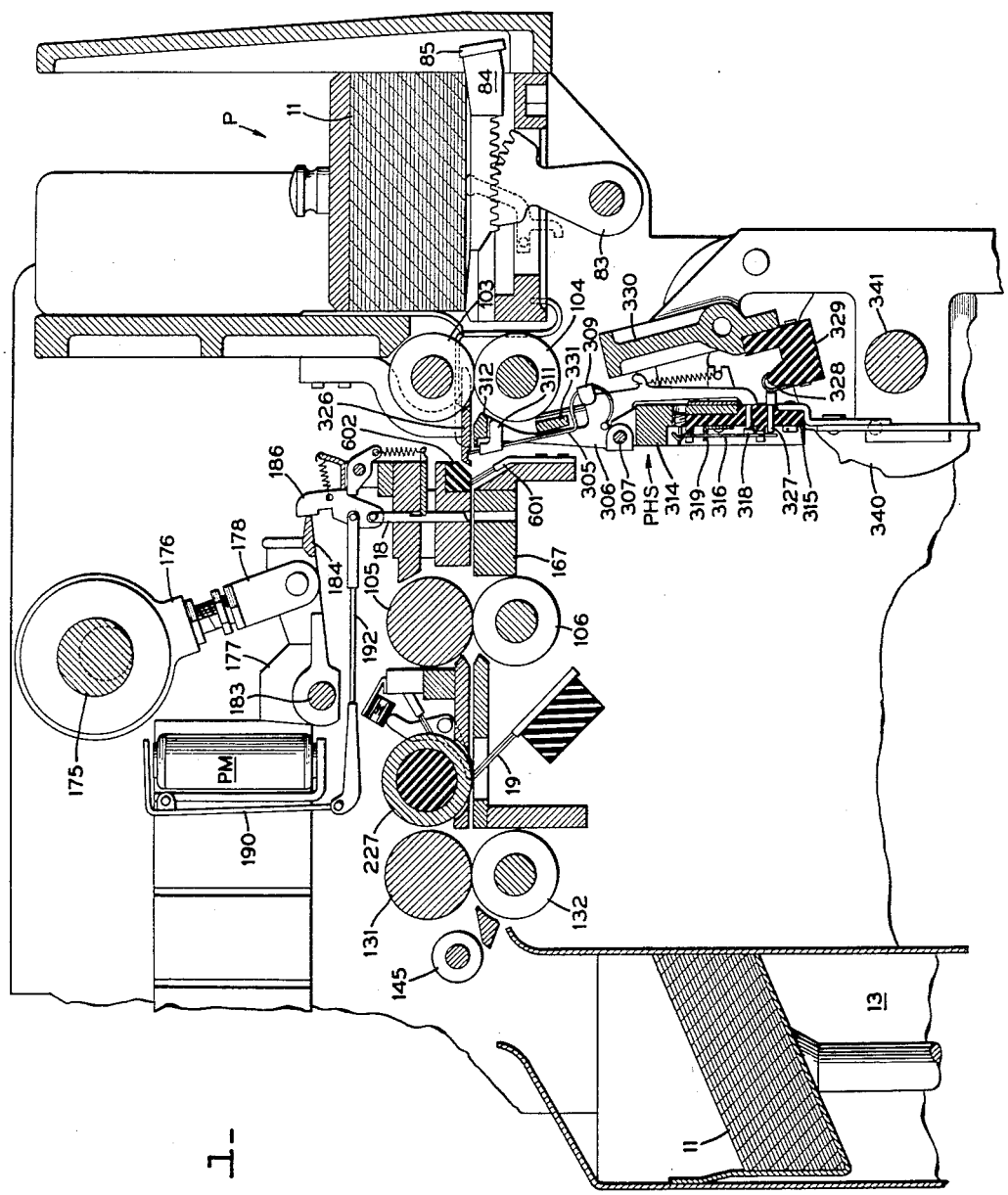
Fig. 1 is a sectional elevation view of the machine showing the feeding, sensing and perforating devices.

The operation of one type of machine to which the invention may be applied will first be briefly explained with reference to Fig. 1 and thereafter the manner in which the invention is applied thereto will be set forth, it being understood that the present invention may be used to sense holes in records generally. Reference may be had to Reissue Patent 21,133 for a more detailed explanation of the illustrative machine, which is commercially known as the IBM reproducing punch. The present invention is concerned with only the punching section of said machine and therefore, it is deemed unnecessary to show or describe the read section of the reproducing machine. To facilitate cross reference the same reference characters will be employed as in the patent to like elements and the elements of the invention will begin with the number 302.

The record cards 11 are fed from the hopper P by the oscillating arm 83, reciprocating slide 84, and picker 85 to the feed rollers 103, 104, which rollers convey the said card past the new pierced hole sensing unit, indicated generally as PHS on Fig. 1. It will be noted that sensing unit PHS replaces the usual punch card master card brushes 17 shown in the said reissue patent. The card is then moved past a mark sensing station, which is disposed ahead of the punching station and comprises the sensing brush assembly 601 and insulating bar 602 (shown similarly in Patent 2,275,396). From the mark sensing station, the card is conveyed to and past the punching station, comprising a row of punches 18 and die 167. Rollers 105, 106 then convey the punched card past the sensing station, comprising brushes 19 and contact roller 227, and by means of rollers 131, 132 and deflecting roller 145, the said punched card is conveyed to discharge hopper 13. The sets of rollers which convey the record card through the punching section of the machine are intermittently driven, so that the card is advanced in steps, with each row of index point positions pausing momentarily in the punching position to receive a perforation, if, at such time the magnet PM is energized.

Energization of the said magnet PM will rock its armature structure 190, drawing a link 192 toward the left to effect coupling between an interposer 186 and a plate 184. The plate 184 is carried by member 177 pivoted at 183 and oscillated, by means of a link 178 connected to an arm 176 on shaft 175.

The description, up to this point, relates briefly to the prior art machine described in greater detail in the aforementioned reissue patent which can be referred to for the description of the starting and operating control elements, and circuits for rendering the mechanism, which will be referred to hereinbelow, continuously operated.

In the description to follow, the record cards containing the pierced holes are placed in the hopper P, and are fed face down, twelve edge first, individually and successively therefrom by the card picker 84 to the feed rollers 103, 104.

Figure 3:
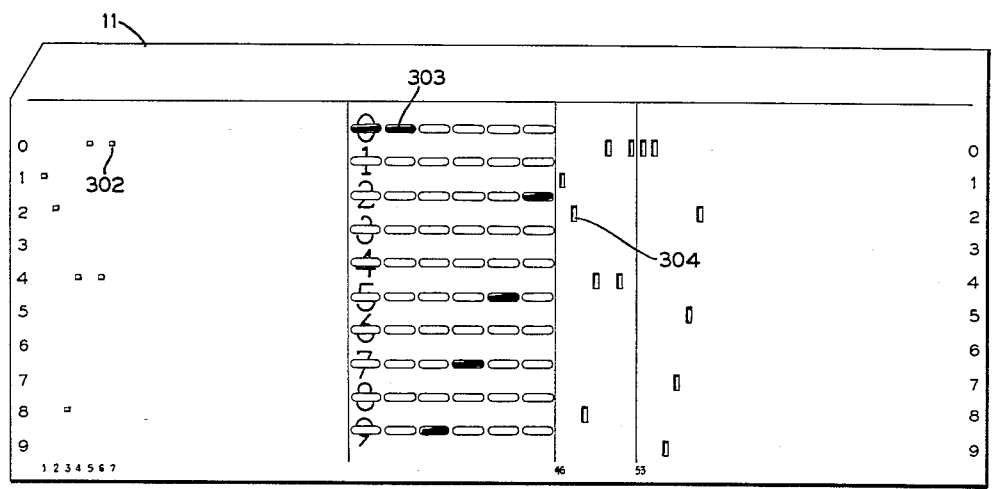
Fig. 3 is a view of a typical record card.

A typical record card is shown in Fig. 3 having pierced holes 302 at the "8," "4," and "0" index point positions. This data is also shown transposed into standard size perforations 304, the perforations corresponding to the data represented by the pierced holes being disposed in columns 46 through 52.

These cards are then fed by the said feed rollers past the pierced hole sensing station PHS. The pierced hole sensing unit, as shown in Figs. 1, 4a, 4b, and 4c, comprises a plurality of spaced sensing wires 305 which are individually disposed on a plurality of spaced levers 306 pivoted on a bar 307. There are, in fact, four hundred of these sensing wires, five for sensing each columnar position of the standard card and they are arranged with respect to the punching station, so that the index mark positions on the card are sensed three cycle points before the corresponding index mark positions sensed are fed to the punching station.

There are eighty of the levers 306, each lever supporting five sensing wires placed side by side. The lower extremity of each sensing wire is attached around a stud 308 on its associated lever and has a bent portion which is retained by two ears 309, 310 of the lever in a fashion so that the upper extremity of the sensing wire extends up between the sides of a bracket member 311 integral with each lever 306. The bracket members 311 extend into slots of a comb plate 312 which serves as a part of the card bed for the punch feed. A guide block 311a is provided between the sides of each bracket member 311 providing a small rectangular hole between the block and the lever to guide the five sensing wires.

The lever supporting bar 307 is mounted in a comb member 313 which is slotted to receive the individual levers 306. The comb member 313 is an integral part of a block 314 which is suitably attached to the main casting 315, of an insulating material, of the sensing unit.

Mounted alongside the casting 315 and extending across the width of the sensing unit is a series of one hundred and sixty contact wires 316, there being two wires for each column of the record card. These contact wires are held in position by means of an adjustable insulator bar 317 and plungers 318 which serve to force the middle of the wires against the inner edge of individual slots in a conducting strip 319, which is attached to the main casting 315. There are eighty of the plungers 318 slidably mounted in the casting 315, and the adjustable bar 317 is slidably mounted in grooves 317a in side plates 317b of the casting 315. Set screws 320 are provided to adjust the bar 317 into a bend in one end of each contact wire to regulate the tension on the wires.

The plungers 318 are normally retained in an extended position against the contact wires by means of the lower extremities of the levers 306. Each lever is normally urged in a clockwise direction about bar 307 by means of a spring 321, extending between a projection 322 on the lever and a bar 323 positioned in a slot of a comb member 324. The comb member 324 is attached to the lower extremity of the block 314 and extends across the sensing unit serving as a guide for the levers 306.

As shown in Fig. 1, when there is no card at the sensing station, the sensing wires extend against one side of a notch in the underside of a plate 326 and the lower extremities of the contact wires are out of contact with the ends of a series of conducting inserts 327 mounted in the casting 315, there being one insert for each two contact wires.

Turning now to Fig. 4a, there is shown the position of the sensing components during the sensing of a blank portion of the record card. The position of the components will change slightly due to the fact that the wires will be moved downward by the thickness of the card and the loop portion is now pressing the wires against the bottom of the card. However, the contact wires and conducting inserts are still out of contact with each other. Fig. 4b shows a sensing wire encountering a pierced hole and it will be noticed that the position of the components has now changed. The sensing wire now extends into the pierced hole and as the card moves in the direction of the arrows it pulls the sensing wire along with it causing the lever 306 to pivot counterclockwise. The lower extremity of the lever has been moved away from plunger 318 allowing the contact wires to push said plunger inwardly until the lower extremity of the contact wire contacts one end of the conducting insert 327.

The other end of the conducting insert is in contact with a contact wire 328 (Fig. 1), of which there is one for each insert, attached to an insulator block 329. The block 329 is attached to a bracket member 330 mounted in the frame of the punching machine. The contact wires 328 serve to complete circuits from the inserts 327 to a suitable storage unit, by way of a customary plugboard, to control the punching operation of the machine as disclosed in my aforementioned earlier filed application.

Turning now to Fig. 4c, the sensing components are shown restored to their normal position after the pierced hole has moved out of sensing position. It will be noted that contact between the insert 327 and the contact wire is now broken. The restoring of the components is accomplished by means of a restoring bail 331 which is cammed down once each cycle point against the bent portion of all the sensing wires. As a result, the wires are pulled down out of the pierced holes and the levers 306 are pivoted clockwise, by springs 321, until their lower extremities strike the main casting 315 and restore the plungers 318. When the bail 331 is returned upward, the sensing wires move upward slightly with respect to their levers, due to the tension in the bends, and are ready to sense the next perforation.

Figure 2:
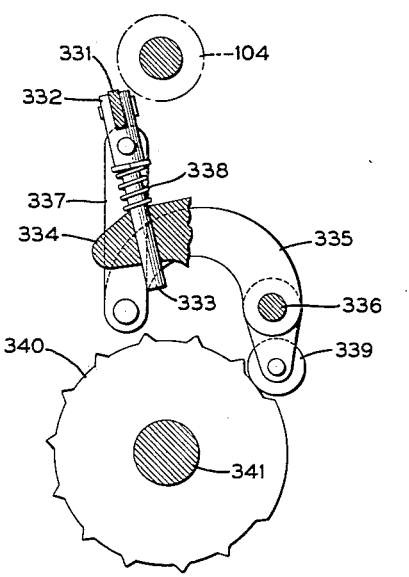
Fig. 2 is a view showing the arrangement of the restoring bail mechanism.

Referring to Fig. 2, the restoring bail 331 is mounted at each end in a sleeve 332 integral with a rod 333 which is slidable in a support casting 334. At one end of the bail, a curved link 335, pivoted on an auxiliary shaft 336, is connected to the sleeve 332 by a link 337. A coil spring 338, extending between the sleeve and the support casting, normally urges link 335 to pivot clockwise to cause a follower 339, pivoted thereto, to ride on the periphery of a cam 340 fixed on a shaft 341 journaled in the side frames of the punching machine.

The cam 340 is continuously driven by suitable gearing on the main machine. The periphery of the cam has eleven short projections and one long projection which correspond to the index point positions on the card. The record cards are fed through the feed of the punching machine "12" edge first and since the pierced hole sensing unit is disposed three cycle points ahead of the punching die, a pierced hole in the "12" index point position is sensed at "9" time on the machine index. The cam is timed according to the reading of the card with the long projection effecting restoraton of the sensing wires between the sensing of the "9" index point position on one card and the "12" index point position on the following card, which is actually between "6" and "9" time on the machine index. Movement of lever 335 by any of the projections will cause link 337 and the sleeve 332 to pull the restoring bail down against the sensing wires to restore them.

It will be understood that the pierced hole sensing unit can be used, in the same manner, to sense standard size perforations 304, either alone or in combination with the pierced holes, should it be desirable, for example, to transpose the standard punchings from one field to another field on the card.

Also, since the sensing unit is located in the position normally occupied by the punch X brushes of a standard reproducing punch, the sensing wires can be employed for sensing X punched holes and no punch X brushes are required.

From the pierced hole sensing unit PHS, the cards are moved past the mark sensing station comprising the conventional mark sensing brush assembly 601 and insulating bar 602.

From the mark sensing station, the cards are moved past the row of punches 18 and die 167 where the standard size perforations are made in accordance with the data sensed by the pierced hole sensing mechanism and/or the mark sensing brushes. The punched cards are then conveyed past the sensing station, comprising brushes 19 and contact roller 227, and, by means of rollers 131, 132 and deflecting roller 145 are finally conveyed to the discharge hopper 13.

As was previously mentioned, in the illustrative embodiment of the invention the pierced hole sensing unit is positioned three cycle points ahead of the punching die. As such, a suitable storage unit of the type shown and described in my application, Serial No. 285,566, filed May 1, 1952, may be provided to store the pierced hole readings until the sensed card reaches the punching die at which time said storage unit will become effective to cause the punching mechanism to operate in accordance with the pierced hole data sensed.

While there have been shown and described and pointed out the fundamental novel features of the invention as applied to a single modification it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a perforated record controlled machine, in combination, a wire sensing element having one bent extremity, a rockable member, means on said rockable member for holding said sensing element, said means including retaining members for the bent portion thereof, and said wire sensing element being positoned relative to a record to be sensed whereby said record will deflect said element to condition same to pass through perforations in said record.

2. The invention set forth in claim 1 having a movable member positioned between the card and the bent extremity of said sensing element and cyclically operable means for moving said movable member down against said bent extremity to retract said sensing element from a perforation in the record.

3. The invention set forth in claim 1 having contact means opposite one end of said rockable member and adapted to be moved by said rockable member into either one of two contact positions.

4. In a perforated record controlled machine, in combination, a wire sensing element having one bent extremity, a rockable member, means on said rockable member for holding said sensing element, said means including retaining members for the bent portion thereof and a single retaining member at one extremity of said sensing element, means for moving said rockable member toward a record being sensed, said wire sensing element being positioned relative to a record to be sensed whereby said record will deflect said element to cause said sensing element to pass through perforations in said record, contact means opposite one end of said rockable member, and an operating member between said contact means and the rockable member for holding said contact means in one position when said rockable member is moved toward the record, said record being effective, when the sensing element encounters a perforation, to cause said sensing element and rockable member to rock in a reverse direction and thereby effect movement of said contact means to a different position.

5. In a perforated record controlled machine, in combination, a wire sensing element having one bent extremity, a rockable member, means on said rockable member for holding said sensing element, said means including retaining members for the bent portion thereof, means for feeding records having columnar index point positions of perforated data designations to be sensed, means for moving said rockable member toward a record being sensed, said wire sensing element being positioned relative to a record to be sensed whereby said record will deflect said element to cause said sensing element to pass through perforations in said record, a movable member positioned between the card and the bent extremity of said sensing element, and cam operated means, operating in synchronism with said feeding means, for moving said movable member down against said bent extremity, once for each index point position on the record, to retract said sensing element from a perforation in the record.

6. In a perforated record controlled machine having a feed bed and means for feeding a record to be sensed along said bed, in combination, a wire sensing element having a loop portion formed at one end and a straight portion formed at the other end, a rockable member, means on said rockable member for supporting said sensing element, said means including retaining members for the loop portion thereof, means normally rocking said rockable member and sensing element in one direction to cause the straight end of said sensing element to extend above said feed bed, and means for limiting the movement of said sensing element in said one direction, a record when fed being effective to cam over the sensing element and compress the loop portion thereof to condition said sensing element for more positive movement through perforations in the record.

7. A machine as in claim 6 having contact means opposite one end of said rockable member, an operating member between said contact means and the rockable member for holding said contact means in open position when said rockable member is moved in said one direction, said record being effective, when the sensing element encounters a perforation, to cause said sensing element and rockable member to rock in a reverse direction and thereby effect movement of said contact means to a closed position, and cyclically operable means for rocking said sensing element and rockable member back in said first direction to retract said sensing element and at the same time move said contact means to the open position.

8. In a record sensing device, means to feed a record along a prescribed path, a rockable member mounted on a pivot adjacent said path and transverse to the direction of feed of the record, a spring sensing element on said rockable member positioned so that its end normally projects into the path of a record fed by said feed means, whereby when a record is passing over said sensing element the sensing element is adapted to spring into any depression or hole in the record, the trailing edge of the depression or hole then catching the sensing element and rocking said rockable member.

9. A record sensing device as described in claim 8, characterized by knockoff means operated intermittently in time with the record feed and acting upon said spring sensing element to withdraw the same from the record to allow said rocking member to return to its normal position.

References Cited in the file of this patent

UNITED STATES PATENTS

| | | |
|---|---|---|
| 2,230,680 | Ford | Feb. 4, 1941 |
| 2,345,289 | Reiber | Mar. 28, 1944 |